Nov. 29, 1955  C. M. NORFLEET  2,724,917
FRAME FOR DISPLAYING ADVERTISING
MATERIAL ON MOTOR VEHICLES
Filed May 21, 1952  2 Sheets-Sheet 1

Charles M. Norfleet
INVENTOR.

BY *Lawrence A. O'Brien
and Harvey B. Jackson*
Attorneys

Nov. 29, 1955     C. M. NORFLEET     2,724,917
FRAME FOR DISPLAYING ADVERTISING
MATERIAL ON MOTOR VEHICLES
Filed May 21, 1952     2 Sheets-Sheet 2
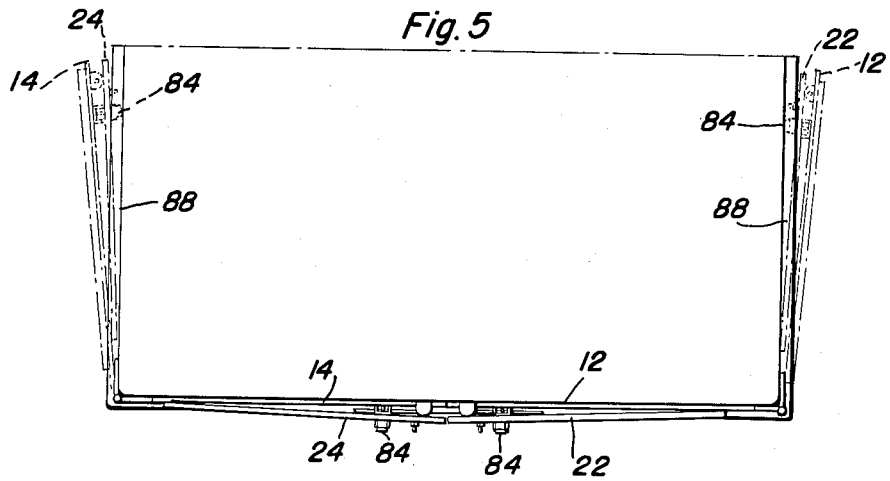
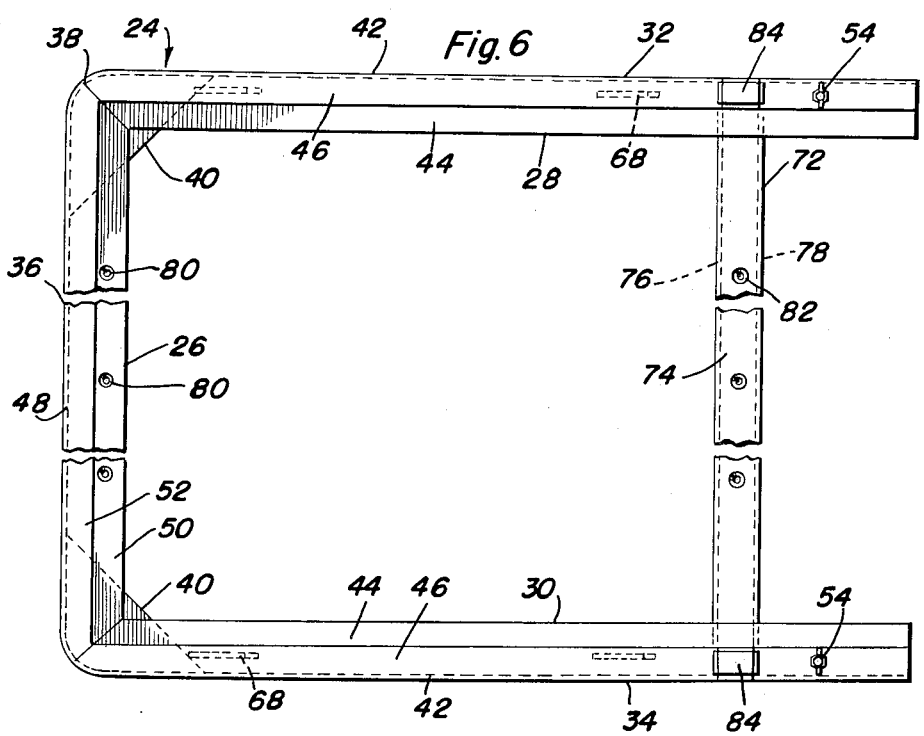
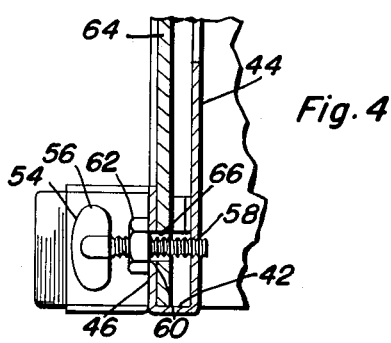
Charles M. Norfleet
INVENTOR.

United States Patent Office 2,724,917
Patented Nov. 29, 1955

2,724,917

FRAME FOR DISPLAYING ADVERTISING MATERIAL ON MOTOR VEHICLES

Charles M. Norfleet, Winston-Salem, N. C., assignor of one-fourth to Charles M. Norfleet, Jr., one-fourth to M. E. Miller, and one-fourth to Winfield Blackwell, all of Winston-Salem, N. C.

Application May 21, 1952, Serial No. 289,150

5 Claims. (Cl. 40—129)

The present invention relates to advertising display frames and more particularly relates to a display frame that is especially adapted for mounting on freight vehicles.

It is the primary object of the present invention to provide a frame particularly adapted for displaying advertising material on the rear end or rear doors of a motor truck, motor freight carrier, van, trailer, etc.

It is a further object of the invention, ancillary to the preceding object, to provide a sectional advertising display frame that may be disposed or mounted on the rear end of a freight vehicle whereby each section of the frame is at an angle to the other to prevent glare to drivers of automotive vehicles driving behind the vehicle upon which the advertising is displayed.

Still a further object of the present invention is to provide an advertising display frame that is adapted to be mounted on the rear doors of a freight vehicle of the type having horizontally swinging rear doors whereby a unitary advertising sign may be displayed across both rear doors of the vehicle without interfering with the opening and closing of the doors of the vehicle, or interfering with the locking mechanism of the rear doors.

Yet another object of the present invention is to provide a sectional frame for displaying advertising signs wherein the sections are comprised of complementary U-shaped members whereby the advertising signs may be conveniently inserted through the open end of each section between the legs of the U-shaped member.

Other novel features of the present invention reside in the means for maintaining the advertising sign within the U-shaped sections of the frames and the novel means for preventing rattling of the sign within the frame when the frame is mounted on the back of a vehicle.

These, together with various ancillary features and objects of the invention which will later become apparent as the following description proceeds, are attained by this device, a preferred embodiment of which is to be illustrated by way of example only in the accompanying drawings wherein:

Figure 4 is a sectional view along section lines 4—4 of Figure 1 showing the means whereby the advertising sign is fixedly secured within the display frame section;

Figure 5 is a top view of the sectional frame being mounted on the rear doors of a vehicle showing in outline form the position of each section of the frame when the doors are in open position; and Figure 6 is a perspective view of one of the sections of the sectional frame.

Figure 1:
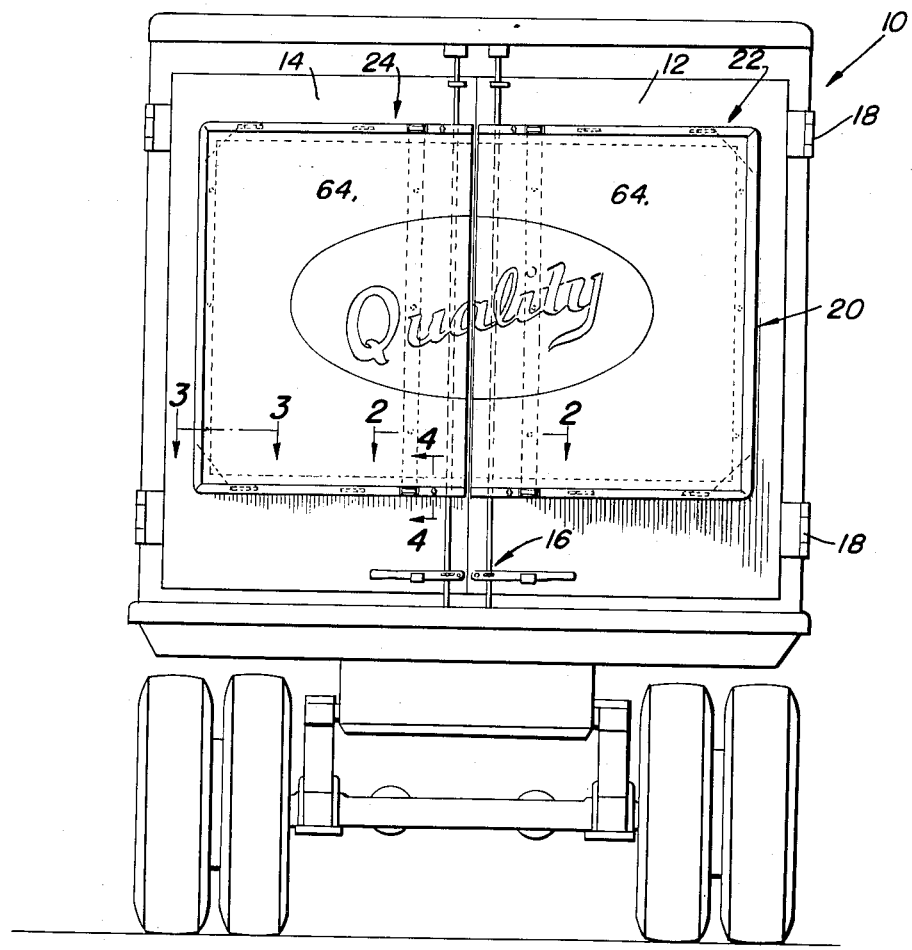
Figure 1 shows the rear end of a motor freight vehicle having horizontally swinging rear doors thereon with the sectional frame of the present invention being mounted on the doors.

Referring now more specifically to the accompanying drawings, wherein like numerals designate similar parts throughout the various views, attention is first directed to Figure 1 wherein the rear end of the motor freight vehicle is designated generally by the numeral 10. In this, the preferred form of vehicle with which the sectional advertising frame is to be used, the rear end of the vehicle 10 is closed by a pair of horizontally swinging doors 12 and 14, respectively, which are adapted to be held in their closed position by means of a conventional latching mechanism disposed exteriorly of the vehicle and generally designated by the numeral 16.

In connection with the above, it is to be noted that the doors 12 and 14 are adapted to be swung about hinges 18 mounted on the frame of the vehicle 10. However, the vehicle itself is of a conventional variety, which in itself forms no part of the present invention.

The sectional advertising display frame of the present invention is designated generally by the numeral 20 and comprises two complementary U-shaped sections 22 and 24, respectively. Since the U-shaped sections 22 and 24 are alike in construction with the exception of being reversed with regard to one another, a description of one will suffice for both.

In Figure 6, the details of construction of section 24 are clearly shown and reference will now be had to that figure. As shown therein, U-shaped section 24 comprises a central portion 26 and parallel leg portions 28 and 30 extending from opposite ends of the central portion. Leg 28 comprises laterally extending channel member 32 and leg 30 comprises laterally extending channel member 34, while the central portion 26 comprises channel member 36. At the juncture of channel members 32 and 34 with the central portion channel member 36, the ends of the channels are beveled where they abut one another as at 38. To rigidly secure the legs 28 and 30 to the central portion 26, gusset plates 40 are provided. Each of the leg channel members 32 and 34, respectively, includes a web 42, a long flange 44 and a relatively shorter flange 46 while the central portion channel member 36 includes a web 48, a long flange 50 and a relatively shorter flange 52. The channel members 32 and 34 comprising the legs 28 and 30, respectively, open toward one another while the channel member 36 of the central portion 26 opens toward the free ends of the legs 28 and 30. Thus, a continuous groove is provided throughout the section. To insert an advertising sign therein, it is necessary only to slide the sign endwise between the free ends of the legs 28 and 30 and the sign will be guided in the groove formed between flanges 44 and 46 until it seats against web 48 between flanges 50 and 52 of the central portion 26.

Fastening means 54 are provided adjacent the free ends of the legs 28 and 30 to retain the sign portion within the section 24. In the enlarged sectional view shown in Figure 4, the construction and operation of the fastening means 54 is clearly shown. The fastening means 54 comprises a thumb screw 56 which is threaded into the threaded aperture 58 in flange 44 and extends loosely outwardly through the aperture 60 in flange 46. Lock nut 62 threaded on the thumb screw 56 and abutting the exterior surface of the flange 46 effectively prevents loosening of the set screw or thumb screw 56 due to vibration of a vehicle upon which the frame is mounted. Thus, when a portion 64 of an advertising sign is mounted in the section 24, an aperture or opening 66 is drilled or otherwise placed therein in alignment with apertures 58 and 60 in flanges 44 and 46, respectively, and the portion of the sign is consequently held in fixed relation to the section 24 by virtue of the thumb screw 56.

To prevent rattling of the portion of the sign 64 disposed within the section 24, or its complementary section 22, resilient leaf spring members (Figures 3 and 6) are disposed between the flanges 44 and 46 of the legs 32 and 34. Each of these leaf springs 68 has one of its ends secured to the long flange 44 as at 70 with its remaining portion being normally biased toward flange 46. Thus, when the portion 64 of the advertising display sign is mounted in one of the sections 22 or 24, the sign portion is normally biased against short flanges 46 and 52. Therefore, the sign portion 64 will not be permitted to oscillate between the flanges of each channel of the section in accordance with road vibrations set up by the vehicle upon which the sign is being displayed.

To maintain the legs 28 and 30 in their parallel spaced relation, a spacing member comprising a channel member 72 extends therebetween. The channel member 72 comprises a web 74 and flanges 76 and 78, the back of the web 74 being secured in any conventional manner to the exterior surfaces of the long flanges 44 of the legs. It will be noted from an examination of Figure 2 that flange 78 is of slightly greater length than flange 76 and that these flanges extend from the major plane of the section 24. The purpose of this flange structure and the rearward projection thereof will immediately become apparent in the following paragraphs.

Figure 2:
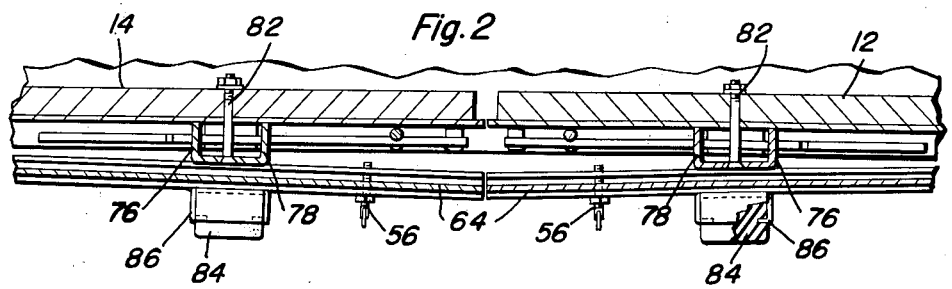
Figure 2 is a sectional view taken substantially along the section line 2—2 of Figure 1 showing how the adjacent ends of the sectional advertising frame are spaced from the rear doors of the vehicle.
Figure 3:
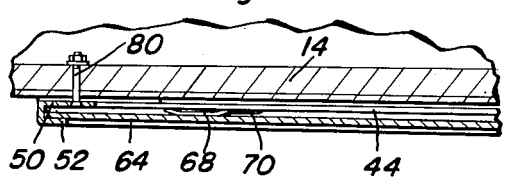
Figure 3 is a sectional view taken substantially along the section line 3—3 of Figure 1 showing how the outside portion of one of the section frames is secured to the rear door of the vehicle.

To fasten each section 24 and 22 of the frame 20 to the rear door of the vehicle 10, a plurality of vertically spaced fasteners 80 extend through the flange 50, these fasteners being disposed beyond the terminal edge of flange 52 in order to provide easy accessibility thereto. A further set of fasteners 82 extend through the web 74 on the spacing channel 72 and project considerably beyond the terminal edges of flanges 76 and 78. With reference to Figures 2 and 3 of the drawings, the mounting of the sections 22 and 24 of the frame 20 on the rear doors 12 and 14 of the freight vehicle 10 may be clearly observed. Fasteners 80 extend through the rear doors 12 and 14 and maintain the flanges 50 in abutting engagement therewith adjacent the hinge connections 18 of each door. Fasteners 82 extending through the web 74 of the channel spacer 72 likewise extend through the doors 12 and 14 of the vehicle 10 adjacent the meeting edges of the doors and draw the edges of the flanges 76 and 78 into abutting engagement with the doors. Due to the rearward projection of the channel spacer 72, the free ends of the legs 28 and 30 of each section will be spaced away from the doors of the vehicle thereby providing assurance that the locking mechanism 16 for the doors will be in no way interfered with. By virtue of the different lengths of flanges 76 and 78 of the spacer members 72, each section of the frame 20 will be disposed in angular relation to its corresponding door 12 or 14. Thus, any glare that may be reflected by the sign portions 64 disposed in the frame 20 by oncoming head lights will be reflected to either side of the vehicle thereby eliminating glare reflecting into the eyes of the driver of the vehicle.

To prevent the frame when mounted on the vehicle doors 12 and 14 from being damaged by or damaging the side walls of the vehicle 10 when the doors 12 and 14 are open, resilient rubber stops 84 are mounted adjacent the free ends of the legs 28 and 30 of each frame section. As shown in Figure 2, angle brackets 86 are secured in a conventional manner to the exterior surfaces of flanges 46 and have portions thereof penetrating the rubber stop members 84 to hold them securely in place.

Thus, when the doors 12 and 14 are in open position as shown in Figure 5, the stops 84 will abut the side walls 88 of the vehicle and prevent damage thereto. In connection with Figure 5 it might also be noted that the angular attachment of sections 22 and 24 to the doors 12 and 14 in no way interferes with the substantially complete opening of these doors whereby they may lie flat against the side walls 88.

From the foregoing, it is believed that the construction and operation of the advertising display frame will be clearly apparent. However, since numerous modifications and changes may readily occur to those skilled in the art after a consideration of the foregoing specification and accompanying drawings, it is not desired to limit the invention to the exact construction shown and described, but all suitable modifications and equivalents may be resorted to falling within the scope of the appended claims.

Having described the invention, what is claimed as new is:

1. An advertising display frame for use on the back of a vehicle having horizontally swinging doors comprising a pair of complementary sections, each section having a central portion and legs extending therefrom, the free ends of the legs of each section terminating adjacent one another, spacing members extending between and being secured at their ends to the legs of each section, said spacing members being disposed rearwardly of the plane of each section and serving to angulate the sections with respect to one another, the central portion and legs of each section comprising channel members, the webs of which define the periphery of each section, said channel members having beveled edges abutting one another at the juncture of the legs and central portion of each section, each channel member having a long flange and relatively shorter flange, at least one of the long flanges of each section having apertures therein disposed beyond the terminal edges of said shorter flange, and fasteners extending through said apertures for fastening a portion of the section to a vehicle door.

2. The combination of claim 1 wherein said spacing members have fasteners extending therethrough for securing other portions of the frame sections to the truck doors.

3. The combination of claim 1 wherein resilient means are disposed between the flanges of each channel to press an advertising sign into seating engagement with one of the flanges thereof.

4. The combination of claim 1 wherein resilient means are disposed between the flanges of each channel to press an advertising sign into seating engagement with one of the flanges thereof, the channels defining the legs of each section having aligned apertures in the flanges thereof, fastening means extending through said aligned apertures and adapted to maintain an advertising display sign in place disposed in the frame.

5. The combination of claim 1 including resilient stop means secured to each section to prevent damage to the section when a vehicle door is opened.

References Cited in the file of this patent

UNITED STATES PATENTS

| | | |
|---|---|---|
| 74,530 | Harris | Feb. 18, 1868 |
| 1,752,591 | Ellis | Apr. 1, 1930 |
| 2,102,987 | Acy | Dec. 21, 1937 |
| 2,301,834 | Whaley | Nov. 10, 1942 |
| 2,543,605 | Smith | Feb. 27, 1951 |